Aug. 7, 1923.

F. J. BREKELMANS

ANGLE LATH CUTTING MACHINE

Filed Sept. 14, 1922

1,463,791

2 Sheets-Sheet 1

Inventor:
Franciscus Josephus Brekelmans
By
Atty.

Aug. 7, 1923.  1,463,791
F. J. BREKELMANS
ANGLE LATH CUTTING MACHINE
Filed Sept. 14, 1922    2 Sheets-Sheet 2

Inventor:
Franciscus Josephus Brekelmans

Patented Aug. 7, 1923.

1,463,791

UNITED STATES PATENT OFFICE.

FRANCISCUS JOSEPHUS BREKELMANS, OF EINDHOVEN, NETHERLANDS, ASSIGNOR TO VAN DYCK STUMPERS, OF EINDHOVEN, NETHERLANDS, A DUTCH FIRM OF THE NETHERLANDS.

ANGLE-LATH-CUTTING MACHINE.

Application filed September 14, 1922. Serial No. 588,250.

*To all whom it may concern:*

Be it known that I, FRANCISCUS JOSEPHUS BREKELMANS, a subject of the Queen of Holland, residing at Eindhoven, the Netherlands, have invented certain new and useful Improvements in Angle-Lath-Cutting Machines, of which the following is a specification.

My present invention has for its object an efficient machine for the cheap production of angle laths such as are used, inter alia, for packing purposes.

My novel machine comprises two crossed arbors, each carrying a nest of circular saws the circumferences of which lie on a conical surface. Said shafts are adjustable in such a manner that mating saws in both nests have a common tangent in the direction of movement of the work piece. If a board is passed along nests of circular saws disposed as described it will be cut into angles as desired.

In view of the desirability to cut the angles from planed lumber, the sawing machine is preferably combined with a planing machine to form a self contained unit therewith. The lumber is then fed automatically towards the saws and the angles may, if so desired, be discharged automatically.

I am aware that trimming or mitering machines have been proposed with crossing saw arbors, but these machines generally require a special cutter to complete the operation. I am also aware that dovetailing machines have been suggested with nests of circular saws the circumferences of which lie on a conical surface, but in these machines the saws cooperate in another manner than in my novel machine and, moreover, the purpose of said known devices is not the production of angle laths.

Figure 1:
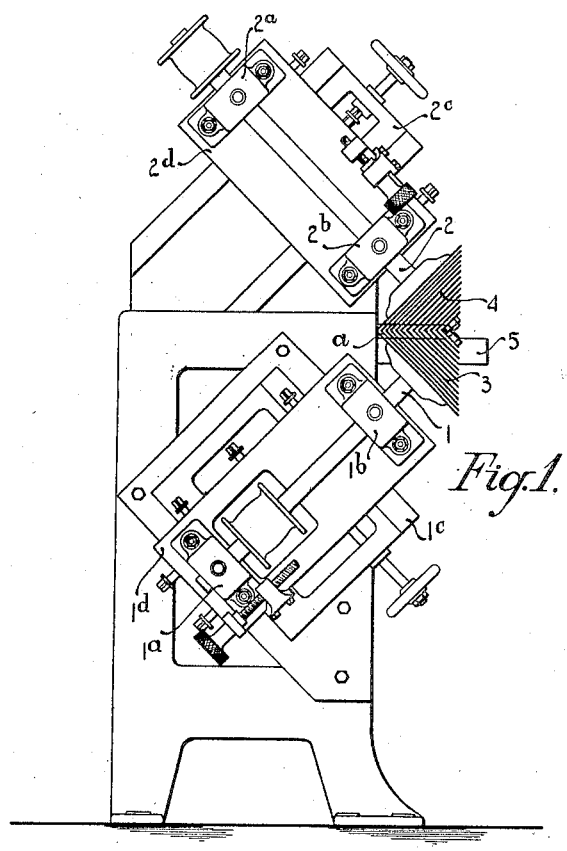
Figure 3:
Figure 2:
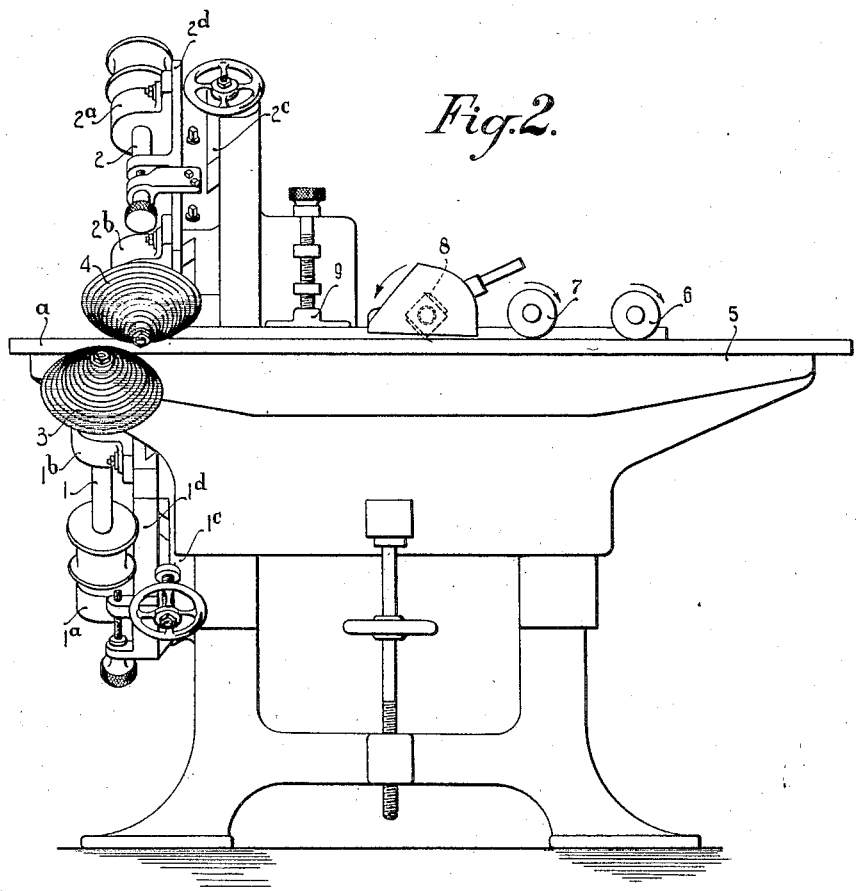

The annexed drawing illustrates, by way of example only, a machine in accordance with my invention, Figure 1 being a side elevational view and Figure 2 a front elevational view thereof. Figure 3 shows a cross sectional view of a board cut into angle laths.

From the drawing it follows that the crossed saw arbors 1 and 2 each carry a nest of circular saws 3 and 4 respectively, the circumferences of the saws in each nest lying on a conical surface. The bearing $1^a$, $1^b$ and $2^a$, $2^b$ respectively of the arbors 1, 2 are adjustable by means of slides $1^c$, $1^d$ and $2^c$, $2^d$ respectively, in such a manner, that each saw arbor may be displaced in parallel relation with itself. The saw arbors may consequently be adjusted so that corresponding saws in both nests of saws have a common tangent in the direction of motion of the board $a$ supported on the vertically adjustable table 5. The cuts produced by the saws divide the board $a$ in a plurality of angle laths $a^1$, $a^2$, $a^3$. . .

The feed rollers 6, 7, the cutter head 8 and the pressure block 9 form parts of the planer with which my novel sawing machine has been combined to form a selfcontained unit.

What I claim is:—

In a machine for cutting angle laths, two crossed saw arbors each carrying a nest of circular saws the circumferences of which lie on a conical surface, said arbors being adjustable in such a manner that corresponding saws in both nests have a common tangent in the direction of feed of the workpiece.

In testimony whereof I affix my signature.

FRANCISCUS JOSEPHUS BREKELMANS.